May 28, 1968  R. S. FREEMAN  3,385,962
METHOD OF AND APPARATUS FOR PRODUCING HIGH
INTENSITY RADIATION BY AN ARC
Filed Sept. 23, 1965  5 Sheets-Sheet 1
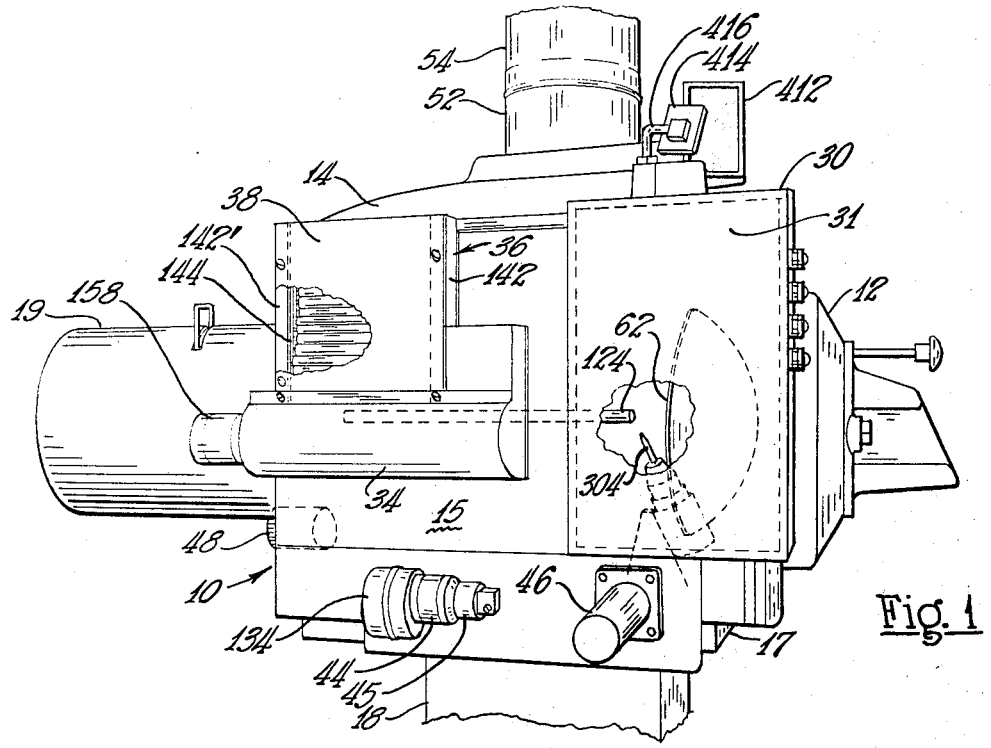
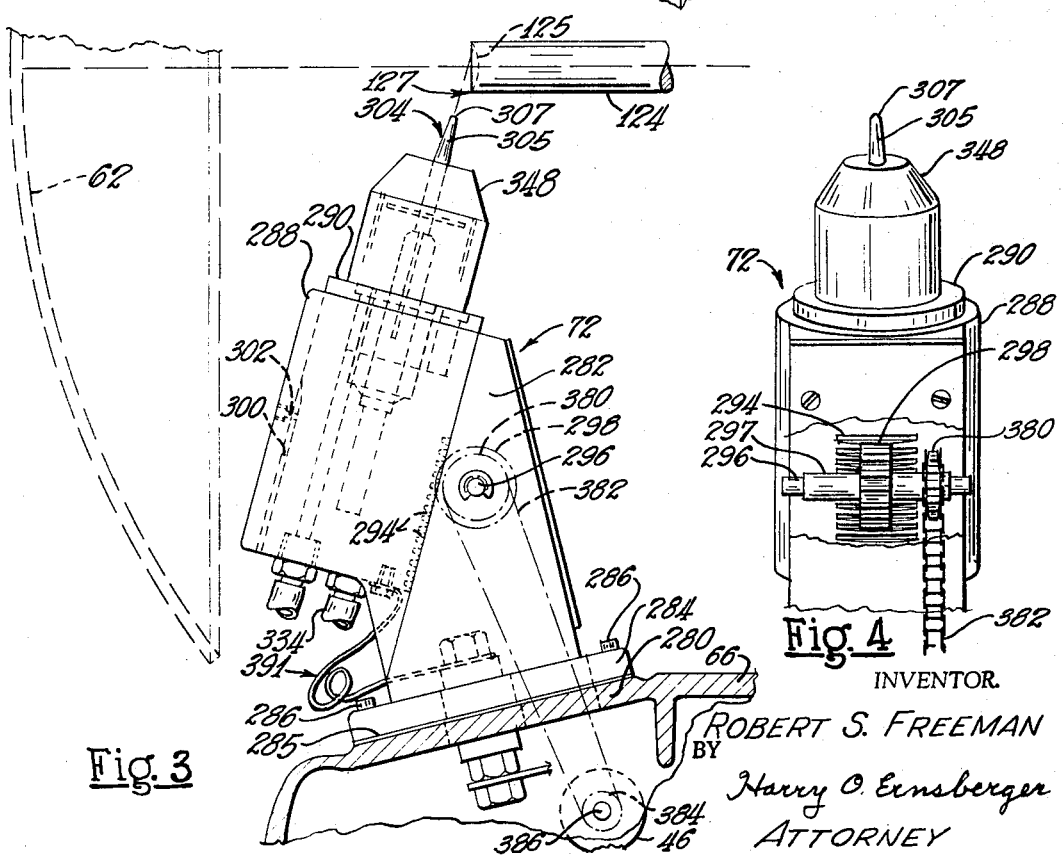
Fig. 1
Fig. 3
Fig. 4
INVENTOR.
ROBERT S. FREEMAN
BY
Harry O. Ernsberger
ATTORNEY May 28, 1968

R. S. FREEMAN 3,385,962

METHOD OF AND APPARATUS FOR PRODUCING HIGH
INTENSITY RADIATION BY AN ARC

Filed Sept. 23, 1965

INVENTOR.
ROBERT S. FREEMAN
BY
Harry O. Ernsberger
ATTORNEYS

May 28, 1968  R. S. FREEMAN  3,385,962
METHOD OF AND APPARATUS FOR PRODUCING HIGH
INTENSITY RADIATION BY AN ARC
Filed Sept. 23, 1965  5 Sheets-Sheet 3
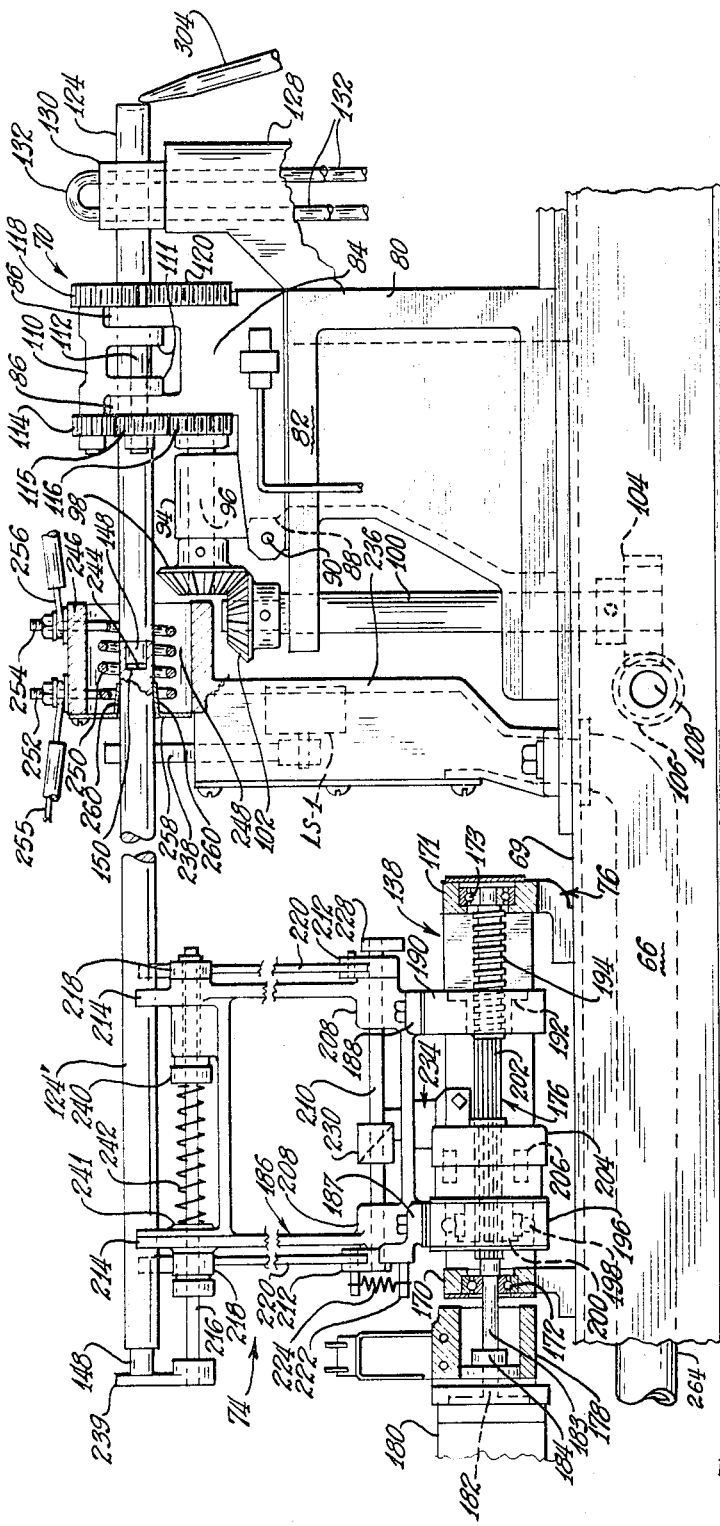
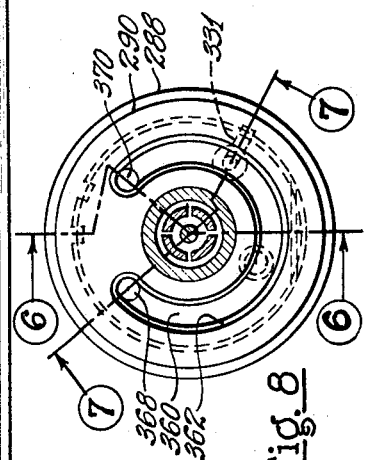
INVENTOR.
ROBERT S. FREEMAN
BY
Harry O. Ernsberger
ATTORNEY May 28, 1968  R. S. FREEMAN  3,385,962
METHOD OF AND APPARATUS FOR PRODUCING HIGH
INTENSITY RADIATION BY AN ARC
Filed Sept. 23, 1965  5 Sheets-Sheet 4
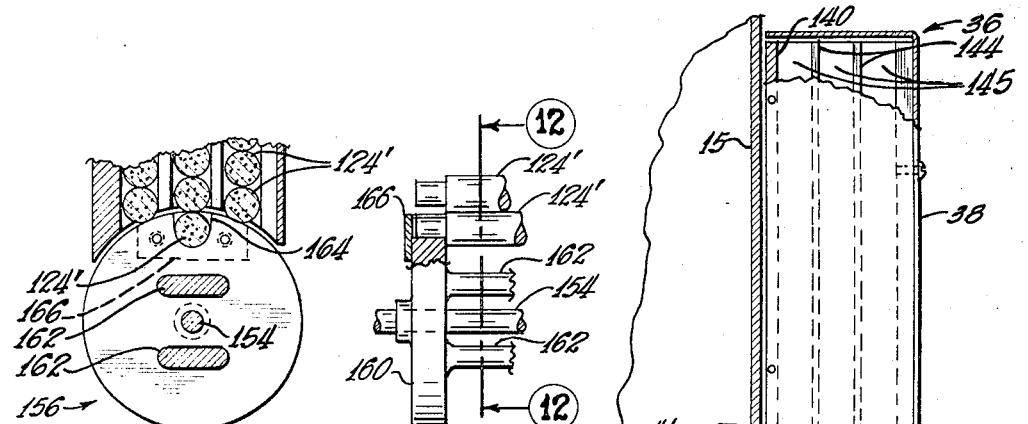
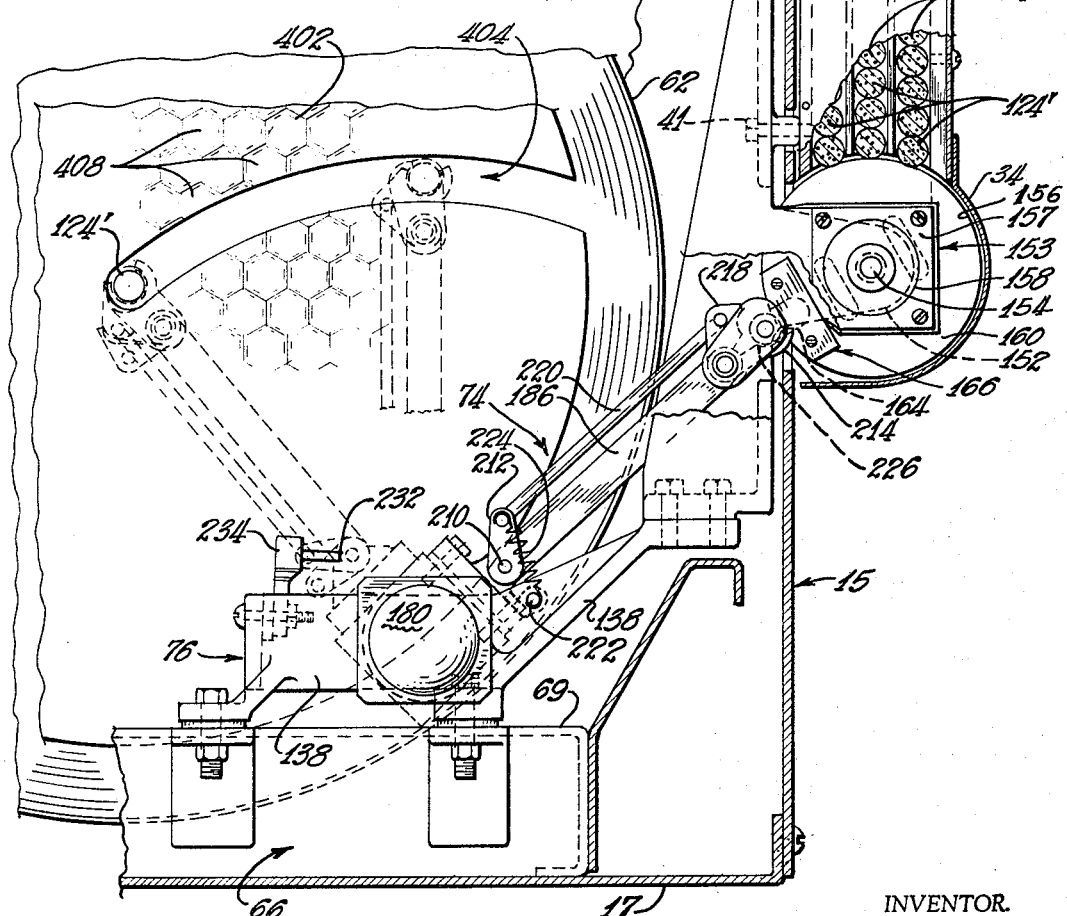
INVENTOR.
ROBERT S. FREEMAN
BY
Harry O. Ernsberger
ATTORNEY INVENTOR.
ROBERT S. FREEMAN
BY
Harry O. Ernsberger
ATTORNEY United States Patent Office 3,385,962
Patented May 28, 1968

3,385,962
METHOD OF AND APPARATUS FOR PRODUCING HIGH INTENSITY RADIATION BY AN ARC
Robert S. Freeman, Toledo, Ohio, assignor to The Strong Electric Corporation, Toledo, Ohio, a corporation of Delaware
Filed Sept. 23, 1965, Ser. No. 489,682
10 Claims. (Cl. 240—41)

ABSTRACT OF THE DISCLOSURE

The device disclosed embraces a method of and apparatus for producing an arc of high intensity radiation involving the use of a substantially nonconsumable negative metal electrode cooperating with a positive carbon electrode and wherein the arc is struck between the electrodes at a region spaced from the tip of the negative electrode, and an inert gas delivered to the environment of the arc.

---

This invention relates to a method of and apparatus for producing high intensity radiation by an electric arc and especially to an electrode system and lens arrangement adapted for simulating solar radiation, the electrode system being capable of continuous operation over long periods of time.

Arc lamps providing high intensity radiant energy have been heretofore developed and used employing carbon positive and carbon negative electrodes of conventional character. In arc lamps of this character, controlled feed means must be provided for both the positive electrode and the negative electrode as both electrodes burn away or are consumed during operation, the positive electrode being consumed at a much higher rate than the negative electrode. Furthermore, the rates of feed for both electrodes must be correlated to continuously maintain the arc at a substantially fixed focal region in order to provide efficient collection of radiation and reflection of the radiant energy by a reflector to obtain efficient use of the energy. Comparatively rapid consumption of the electrodes necessitates periodic interruption of the arc to replace the electrodes.

Developments have been made wherein sections of positive electrodes are successively delivered to an operative position and automatically joined to the preceding electrode section when the latter is nearly consumed whereby the arc may be continued in operation through the period of consumption of a carbon type negative electrode. This provides for a longer life but interruption of arc operation is necessary to periodically replace the negative electrode. Endeavors have been made to join successive carbons for a negative electrode but such endeavors have not been successful. Heretofore a negative carbon electrode about forty-eight inches in length has been used and such length of negative electrode provides for about eighteen hours of uninterrupted operation when employed with an automatic positive electrode section feed device where the positive electrode sections are successively joined at periodic intervals. Practical considerations necessarily prevent the use of longer negative electrodes.

The present invention embraces a method of and apparatus for producing an arc providing high intensity radiation through the use of an electrode system providing for substantially continuous operation without interruption.

An object of the invention resides in an apparatus providing an arc utilizing a negative electrode fashioned of metal wherein no appreciable consumption of the negative electrode takes place over long periods of operation.

Another object of the invention is the provision of apparatus for producing a high intensity arc utilizing a carbon type positive electrode in conjunction with a negative electrode fashioned principally of tungsten which is not consumed during operation and hence feeding and position control devices for the negative electrode are eliminated.

Another object of the invention resides in a construction for producing a high intensity arc employing positive electrode sections which are automatically successively joined to provide a continuous positive electrode in conjunction with a negative electrode fashioned of tungsten in a configuration wherein the arc is initiated or struck at a region spaced from the tip of the negative electrode and an inert gas continuously delivered to the environment of the arc to improve arc stability and promote efficiency of radiation.

Another object of the invention resides in a method of establishing and maintaining an arc between a carbon type positive electrode and a tungsten electrode in an inert atmosphere provided by an inert gas and the delivery of gas regulated to effect a measure of control of the radiation output intensity of the arc.

Another object of the invention resides in the use of a metal electrode which is substantially nonconsumable and requires no feed mechanism as the electrode remains in a relatively fixed position during operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a perspective view of one side of the arc lamp construction embodying the invention;

FIGURE 3 is a side elevational view illustrating the mounting means for the negative electrode;

FIGURE 4 is a front elevational view of the mounting arrangement for the negative electrode;

FIGURE 8 is a sectional view taken substantially on the line 8—8 of FIGURE 6;

FIGURE 9 is an elevational view illustrating the positive electrode feed mechanism, the electrode section transfer mechanism and joining means for the positive electrode sections;

FIGURE 10 is a transverse sectional view illustrating the transfer means for positive electrode sections and the electrode supply mazagine;

FIGURE 11 is a fragmentary elevational view of a component of the transfer means for the positive electrode sections;

FIGURE 12 is a sectional view taken substantially on the line 12—12 of FIGURE 10.

While the embodiment of the invention illustrated herein is particularly usable as a high intensity arc lamp and lens system for simulating solar radiation, it is to be understood that the electrode system and apparatus may be employed in arc lamps of other types for various uses.

Figure 2:
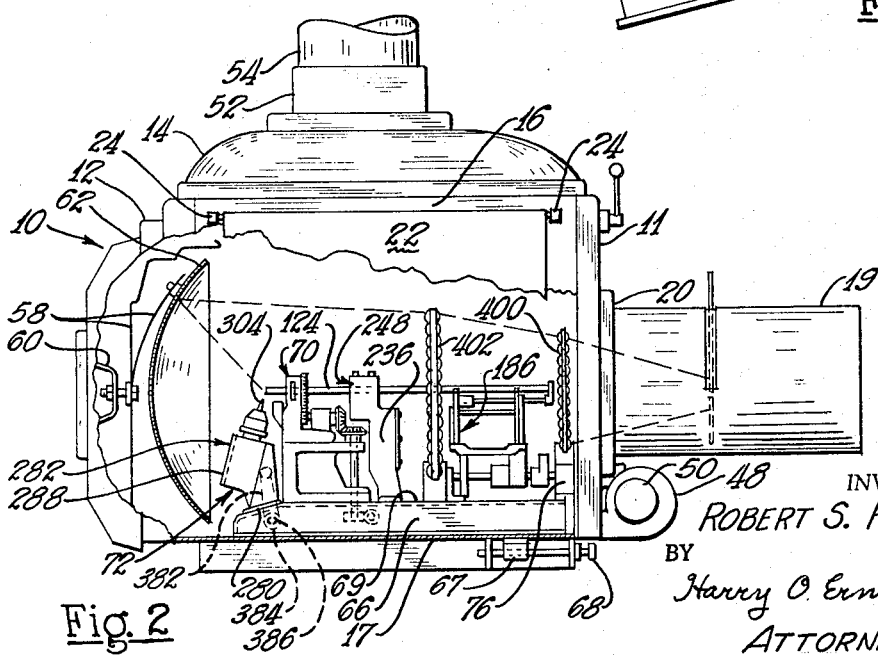
FIGURE 2 is a semi-diagrammatic lengthwise elevational view of the arc lamp particularly illustrating the electrode arrangement, reflector and lens system.

Referring to the drawings in detail, and initially to FIGURES 1 and 2, the arc lamp construction embodying the invention utilizes a carbon positive electrode of the rod type advanced horizontally and replenished by successive carbon electrode sections from a magazine, and a negative electrode arrangement wherein the support for the negative electrode is movable to strike the arc and is thereafter maintained in a relatively fixed position whereby to maintain an arc of substantially constant intensity at the focal point of the reflector to use most effectively the radiant energy from the arc.

The lamp structure or apparatus includes a generally rectangular housing 10 equipped with a front cover or panel 11, a hingedly supported rear door 12, a cover member 14 and side panels 15 and 16, these components being preferably formed of sheet metal and mounted by interior frame components (not shown) carried by a base construction 17. The lamp structure may be supported upon a pedestal 18. The front portion of the lamp includes a cylindrically-shaped hollow extension or casing 19 mounted upon a member 20 secured to the front cover 11. The side panel 16 is provided with a rectangular opening which is normally closed by a hinged cover 22 supported by hinge brackets 24, as shown in FIGURE 2.

With reference to FIGURE 1, there is secured to the side panel 15 of the housing a rectangularly-shaped cabinet 30 equipped with a removable cover 31, the cabinet supporting and enclosing control components and wiring junction blocks for circuit connections (not shown). Disposed adjacent the side panel 15 is a sheet metal housing 34 which encloses a rotatable component of an electrode transfer mechanism for positive electrode sections which will be hereinafter described in further detail. Disposed adjacent the side panel 15 is a rectangularly-shaped magazine 36 adapted to contain a supply of positive electrode sections, the magazine being equipped with a removable closure plate or cover 38.

As shown in FIGURE 10, the magazine 36 is carried by a frame member or bracket 40 by screws 41. Mounted adjacent the lower portion of the side panel 15 is a first motor 44 and a second motor 46, the purposes for which will be hereinafter described. Secured to the front panel 11 is a blower housing 48 containing a rotatable blower driven by a motor 50, the purpose of which will be hereinafter described. The cover 14 is provided with a comparatively large diameter vent pipe 52 adapted to be connected by pipe 54 with an exhaust blower (not shown) of comparatively large capacity for rapidly conveying away heat and combustion gases from the interior of the lamp housing.

The hinged rear door construction 12 is equipped with a supplemental frame 58 secured to the door 12 by a mounting bracket 60 shown in FIGURE 2. A reflector 62 is mounted by the supplemental frame 58 and is supported by adjustable means (not shown) in a conventional manner for adjusting the relative position of the reflector with respect to the position of the arc so as to properly reflect radiant energy from the arc through a lenticular lens system. The reflector is mounted upon the hinged door 12 so that when the door is opened, the reflector is readily accessible for purposes of cleaning or adjustment.

The lamp construction includes a mounting and feeding device for a positive electrode section in arc forming position and transfer mechanism for transferring positive electrode sections from the magazine 36 successively into a position to be joined with a proceeding positive electrode section whereby a continuously operating positive electrode construction is provided with no interruption in operation of the lamp. The positive electrode transfer mechanism and the arrangement for joining positive electrode sections are of the character disclosed in my copending application Ser. No. 325,677, now Patent No. 3,330,987.

As the positive electrode sections are of the carbon type, they burn away or are consumed at a substantial rate and the transfer mechanism provides for the transfer of positive electrode sections periodically from the magazine to a region at which the transferred section is joined with the electrode section in arc forming position. Means is provided for supporting the positive electrode feed mechanism and components of the electrode section transfer mechanism.

A hollow subbase member 66 is disposed within the housing 10 in the position shown in FIGURE 2. The subbase member 66 is equipped with a lug 67 interiorly threaded for cooperation with an adjusting screw 68 for adjusting the subbase longitudinally in the housing. Mounted upon the upper plate portion 69 of the subbase 66 is a positive electrode supporting and driving head 70, shown in FIGURES 2 and 9, and a mounting means 72 for a negative electrode.

The subbase 66 also supports a transfer mechanism 74 for transferring positive electrode sections from the magazine 36 to an operative position adjacent the positive electrode supporting and feeding head 70. The upper plate 69 of the subbase 66 also supports a bracket means 76, the bracket 76 supporting the magazine mounting bracket 40 as shown in FIGURE 10. With particular reference to FIGURE 9, the supporting and feed mechanism for the positive electrode construction includes a pedestal or support member 80 provided with a horizontal portion 82.

Mounted upon the horizontal portion 82 is a head or member 84 fashioned with upwardly extending boss portions 86, the horizontal portion 82 being provided with a boss 88. The head member 84 is supported upon a pin 90 extending through aligned openings in spaced portions of the head member 84 and in the boss 88. The member 84 is provided with a boss 94 which is bored to provide a journal bearing for a shaft 96. Fixedly secured to one end region of shaft 96 is a bevel gear 98. Journally mounted in vertically aligned openings in the horizontal portion 82 of the support 80 and in the base of the support is a drive shaft 100, the shaft carrying a bevel gear 102 meshing with the bevel gear 98.

The shaft 100 extends into the hollow subbase 66 and carries a worm gear 104 in mesh with a worm 106 mounted upon a transversely extending shaft 108 which is driven by the motor 44, shown in FIGURE 1.

The shaft 108 is driven at a comparatively slow speed through speed reducing gearing of conventional construction contained within a housing 45 secured to the housing of the motor 44, as shown in FIGURE 1. Disposed between the boss portions 86 is a bracket 110 having boss portions 111. The bosses 86 and 111 are fashioned with aligned openings accommodating a shaft 112 upon which the bracket 110 is pivotally supported.

Journally supported on shafts carried by the bracket 110 are gears 114, 115 driven by gear 116 mounted upon the shaft 96. The shafts supporting the gears 114 and 115 are equipped with feed rolls 118 and 120, cooperating with a third feed roll (not shown), the feed rolls being of conventional construction equally spaced about the axis of the positive electrode section 124.

The electrode engaging feed rolls have knurled peripheral surfaces engageable with the surface of the positive electrode, the axis of the feed rolls and the supporting shafts being arranged at a slight angle in a conventional manner with respect to the axis of the electrode section 124 so that rotation of the feed rolls slowly advances the electrode section 124 in a right-hand direction as viewed in FIGURE 9 toward arc forming position.

The positive electrode feed arrangement 70 shown in FIGURES 2 and 9 is of the character conventionally employed for feeding a positive electrode in an arc and is of the character of the positive electrode feed construction illustrated in Whitte Patent 2,681,983. The bracket 110 is biased by resilient means (not shown) of conventional construction to engage the feed roll carried thereby with the positive electrode section.

Means is provided for cooling the forward portion of the positive electrode section 124, preferably by water cooling. Secured to the forward portion of the support on pedestal 80 is a member 128 which is of hollow configuration. Mounted on the member 128 is a pair of blocks 130, one of which is shown in FIGURE 9, one block being at each side of the positive electrode section 124. A U-shaped tube 132 is provided for each block and extends through suitable openings in the block.

The tubes 132 are connected with a supply of coolant, such as water, which is circulated through the U-shaped tubes to prevent overheating of the region of the positive electrode section adjacent the arc. The support member 80 is of hollow configuration and the hollow interior thereof is in communication with the hollow interior of the subbase 66. The motor 44 drives a blower 134 for conveying air into the hollow subbase 66, the air passing upwardly through the hollow support 80 and through vent openings (not shown) in the upper part of the support 80 to assist in cooling the components carried by the support 80.

FIGURES 9 through 13 illustrate the means for selecting and transferring electrode sections from a supply magazine to a position in alignment with the positive electrode forming the arc and for joining the transferred electrode section with the electrode section being advanced by the feed means toward the arc whereby to provide for perpetuating the arc without interruption to manually insert an electrode section in the feeding means as has been a usual procedure heretofore in arc lamps. The magazine 36 containing a supply of positive electrode sections, and the transfer mechanism are supported upon the subbase 66.

Mounted on the subbase 66 is a bracket 138 to which is secured the bracket 40 supporting the magazine 36. The magazine 36 includes a member 140 disposed in substantial parallelism with the side panel 15 of the lamp housing as shown in FIGURE 10. The bracket 40 is provided with bosses accommodating securing screws 41 threaded into openings in the member 140 of the magazine. The magazine includes end walls 142 and 142', the opposed interior regions of the end walls being equipped with vertical ribs 144 which form vertical channels 145 which receive and accommodate stacks of positive electrode sections 124', there being three vertical rows or stacks of electrode sections as illustrated in FIGURE 10.

As shown in FIGURE 9, the rear end region of each positive electrode section is fashioned with a tenon 148 of reduced diameter, and the forward end of each electrode section is fashioned with a cylindrical recess 150 adapted to receive the tenon of the preceding electrode section for joining electrode sections in a manner hereinafter explained. In order to assure the proper orientation of the positive electrode sections in the magazine 36, the widths of the grooves or channels 145 adjacent the magazine end wall 142' are of lesser width to accommodate the tenons 148 of the electrode sections while the grooves adjacent the opposite end wall 142 are of a width to accommodate the normal diameter of the electrode sections.

The bracket 40 is provided at the end regions with laterally extending projections 152 and 153, shown in FIGURE 10, the projections having aligned openings forming journal supports for a shaft 154 on which is mounted an electrode selector drum construction 156 shown in FIGURES 10, 11 and 12. Secured to the projection 153 of the bracket 40 is a mounting plate 157 of a motor 158. The motor 158 is adapted to rotate the shaft 154 and the electrode feed drum 156 through one complete revolution during each electrode section-transferring operation.

The electrode selector or drum 156 includes circular end portions 160 integrally joined by lengthwise arranged webs 162. Each end plate 160 is provided with a U-shaped recess 164 of a dimension to receive an end of a positive electrode section 124' in the manner illustrated in FIGURES 11 and 12. The ends of the recesses 164 in the portions or plates 160 are closed by members 166 to prevent lengthwise movement of the electrode sections. The rotatable member 156 functions as an electrode selector for selecting or isolating an electrode section from the magazine 36 for transfer to a region aligned with the preceding electrode section in arc-forming position.

It will be seen that upon one complete rotation of the electrode selector 156 in a counterclockwise direction, as viewed in FIGURE 10, when the recesses 164 are in registration with an electrode section 124' in the magazine, the lowermost electrode of the row or stack will enter the recesses 164 by gravity.

Continued rotation of the member 156 carries the selected electrode section into a position to be received by a relatively movable electrode transfer mechanism 74 shown in FIGURES 9 and 10. As shown in FIGURE 9, the support member or frame 138 is fashioned with portions 170 and 171 provided with openings accommodating anti-friction bearings 172 and 173.

A shaft 176 is journally supported in the bearings 172 and 173. Mounted on a portion 178 of the support 138 is an electrically energizable motor 180, the shaft 182 of motor 180 being connected with a portion 183 of shaft 176 through a coupling 184. The electrode section transfer means 74 includes a rectangularly shaped skeleton-like frame or transfer arm 186 provided with bosses 187 and 188. Insulatingly secured to the boss 188 is a member 190, the latter being equipped with a threaded bushing 192, the bushing being threadedly received on a threaded portion 194 of the shaft 176.

Rotation of the shaft 176 through the medium of the threaded bushing 192 effects longitudinal movement of member 190 and the transfer frame or arm 186. A member 196 insulatingly supports the boss 187. The member 196 is bored to accommodate an anti-friction bearing 198, a bushing 200 forming the inner race of the anti-friction bearing 198. This construction provides for rotation of member 190 independently of the bushing 200. A portion of the shaft 176 is splined at 202 and the bushing 200 is correspondingly grooved to accommodate the splined portion 202 whereby the bushing 200 is rotatable with and slidable along the shaft.

Arranged adjacent member 196 is a housing 204 which encloses an electromagnetic clutch 206. The magnetic clutch 206 is adapted when energized to effect rotational movement of the transfer frame or arm 186 about the axis of the shaft 176 to transfer a positive electrode section 124' from the recesses 164 in the plates 160 of the selector drum 156 to the extreme left-hand position shown in broken lines in FIGURE 10 to position the transferred electrode section 124' in axial alignment with the preceding electrode section 124 which is being continuously advanced by the feed mechanism in maintaining the arc.

The electrode transfer frame 186 is rotatable about the axis of shaft 176 to transfer an electrode section to a position in alignment with the preceding transferred section and is movable lengthwise along the shaft 176 through the threaded connection between the threaded shaft portion 194 and the bushing 192 to join the transferred section 124' to the section 124 in a manner hereinafter described. The transfer frame or arm 186 is equipped with means to engage and support an electrode section during the transfer operation.

The frame 186 is fashioned with bosses 208 having aligned openings providing journal support for a shaft 210, the shaft projecting beyond the boss portions 208. Secured on each end portion of the shaft 210 is an arm 212. The frame 186 is provided with projecting portions 214 having aligned openings accommodating a shaft 216. Journaled on the shaft 216 adjacent each projecting portion 214 is a second arm 218. The arms 212 and 218 of each pair are connected by a link 220.

The upper ends of the links 220 are pivotally connected to members 218 and the lower ends of the links are pivotally connected to the arms 212, as shown in FIGURE 10. A pin 222 carried by the arm 186 provides an anchor for one end of a contractile coil spring 224, the other end of the spring being connected to the pivotal connection of a link 220 with one of the arms 212. It will be noted in FIGURE 10 that when the transfer member 186 is in its extreme right-hand position, as shown in full lines, a line through the axis of the pivotal connection of link 220 with the arm 212 and through the axis of the anchor pin 222 is at the right-hand side of the axis of the shaft 210.

Under the influence of the contractile spring 224, this arrangement serves as a toggle means to bias the arms 212 in a clockwise direction about the shaft 210 and, through the medium of the links 220, urge the arms 218 into a position to receive a positive electrode section 124' in a curved recess 226 formed at the upper end of each of the projecting portions 214 of the transfer frame structure 186.

Means is provided for rotating the shaft 210 when the electrode transfer arm 186 approaches the full line position shown in FIGURE 10. Mounted upon the right-hand end of the shaft 210, as viewed in FIGURE 9, is a member 228 which, when the transfer arm 186 approaches its full line position shown in FIGURE 10, engages an abutment (not shown) on the support 138 to rotate the shaft 210 through a partial revolution causing the arms 212 and 218 to be pivoted about their respective pivotal supports to reset the upper arms 218 in a position to provide with the curved recesses 226 a cradle means to receive an electrode section 124' from the magazine 38.

The recesses 164 in the drum plates 160 receive an electrode section from the magazine during rotation of the drum 156 and convey the electrode section into the cradle means provided by the curved recesses 226 in the projections 214 at a region sufficiently below the center of rotation of the drum 156 whereby the electrode section falls by gravity into the cradle recesses 226. A cam member 230, shown in FIGURE 9, mounted on the shaft 210, is arranged to engage a pin 232 carried by a stationary block 234.

During lengthwise movement of the arm or transfer frame 186, the cam 230 engages the pin 232 and rotates the shaft 210 and swings the arms 218 away from the transferred electrode section to enable the transfer arm to swing to its electrode receiving position shown in FIGURE 10, this action occurring while the electrode section carried by the transfer arm 186 is being joined with the preceding section as hereinafter described.

A limit switch LS–1, mounted upon a member 236 supported on the subbase 66, is provided with an upwardly extending electrode sensor member 238 which normally engages the electrode section 124 being advanced by the positive electrode feed head 70 in maintaining the arc. When the electrode section 124 is partially consumed and advanced to a position where the rear end of the section 124 moves out of engagement with the sensor member 238, the member 238, under spring bias, moves to a position to actuate the limit switch LS–1 and initiate operation of the transfer mechanism.

Means is provided for exerting lengthwise pressure upon the transferred electrode section 124' when it is aligned with the electrode section 124. As shown in FIGURE 9, the end region of shaft 216 is equipped with an abutment member 239 adapted to engage the end of the tenon 148 on the transferred electrode section 124'. Fixed on the shaft 216 is a collar 240 and disposed between the collar and a boss 241 on one of the projections 214 is a coil spring 242. The spring 242 provides pressure on the transferred electrode section 124' during the operation of joining the said electrode section with the preceding electrode section 124.

An apparatus is provided for automatically joining a transferred electrode section with the partially consumed preceding electrode section to establish continuity of arc operation. The method of joining the electrode sections involves softening of a resin pellet or disc at a proper time to join or bond the electrode sections together. Each of the electrode sections 124', before being placed in the magazine 36, is provided with a resin pellet 244 in its recess 150.

As shown in FIGURE 9, the tenon 148 on the electrode section being consumed projects into the recesses 150 in the forward end of the succeeding electrode section 124'. The upper portion of the pedestal 236 is fashioned with an annular portion 246 providing a cylindrical chamber or oven 248, shown in FIGURE 9.

An electrically energizable heating coil 250 is disposed concentrically in the chamber 248 and when energized supplies resistance heat to the adjacent overlapping ends of the electrodes to soften or fuse the resin pellet 244 to join or bond the electrode sections together.

Figure 13:
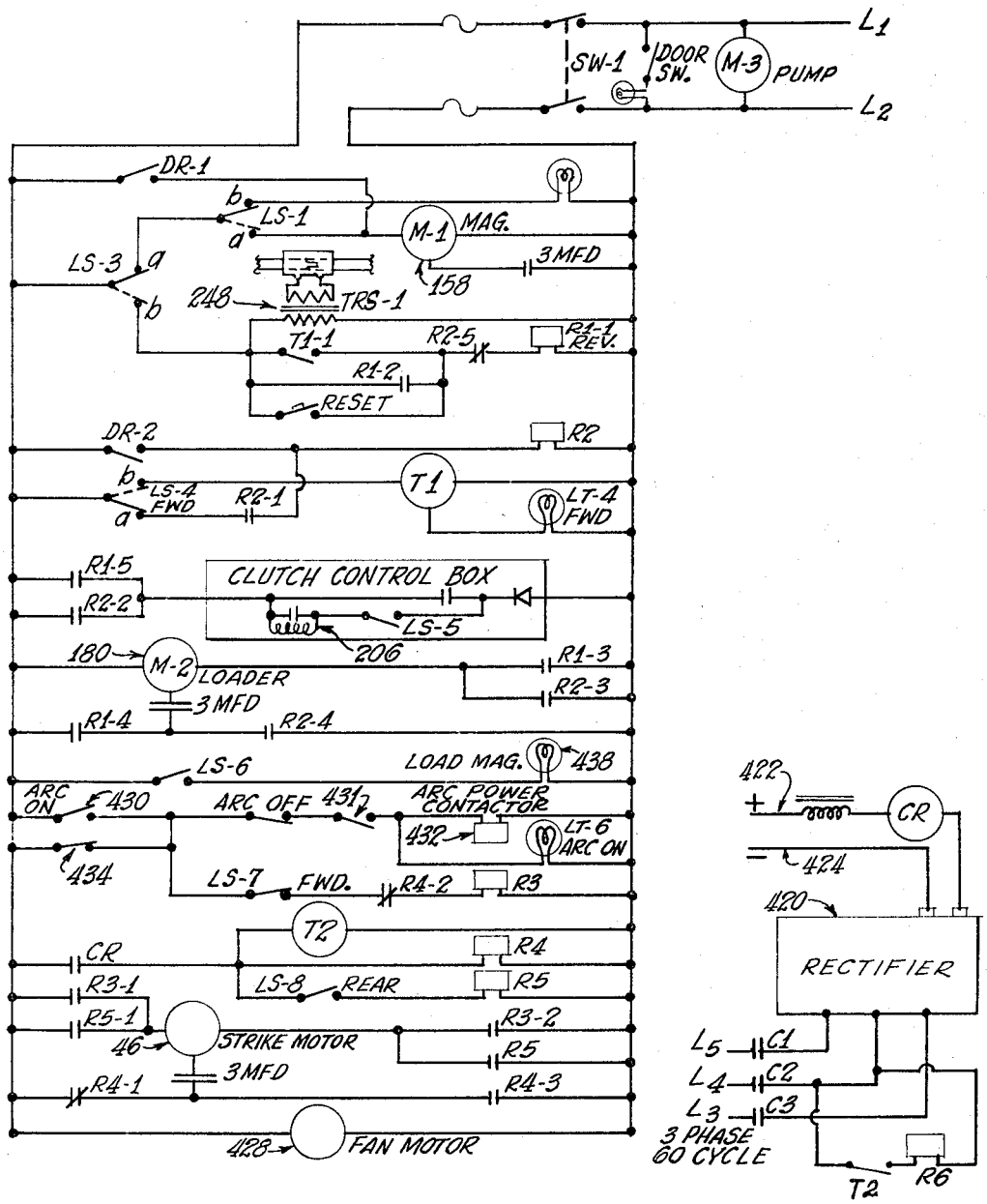
FIGURE 13 is a circuit diagram schematically illustrating the control circuits and control components.

The terminals 252 and 254 for the coil are insulated from the portion 246, the conductors or leads 255 and 256 conducting current from a low voltage transformer TRS–1, shown schematically in FIGURE 13, to the heating coil 250 in the oven or chamber 248. The interior diameter of the heating coil 250 is of a dimension to facilitate movement of the electrode sections therethrough without engaging the coil. A guide plate 258 is equipped with guide members or fingers 260 for properly guiding the transfer electrode into the chamber 248.

When each successive electrode section 124' is transferred into the position shown in FIGURE 9 and moved lengthwise toward the preceding electrode, the heating coil 250 is energized and the heat therefrom softens the resin pellet 244 and bonds or joins the electrode sections together. The transferred electrode section 124' is moved in a right-hand direction as viewed in FIGURE 9 by movement of the transfer arm or frame 186 along the shaft 202, and the spring 242 provides a resilient force to assure pressure exerted lengthwise on the electrode section 124' to assure an effective bond between the electrodes provided by the softened resin of the pellet 244. wardly through the hollow interior of the pedestal 236, As shown in FIGURE 9, an air conveying tube 264 conveys air from the blower 48, shown in FIGURE 2, up- the pedestal being open at its upper end whereby air is directed onto the portion of the electrode section adjacent the oven. By flowing cooling air in this environment, premature softening of the resin pellet is prevented until heat is applied in the oven 248 by the heating coil 250.

The lamp structure is inclusive of a method and means of utilizing a substantially nonconsumable negative electrode 304 fashioned of tungsten whereby, through the use of the automatic means of feeding successive positive electrodes, a substantially continuous operating arc is attained. The negative electrode mounting means 72 and associated components are illustrated in FIGURES 2 through 8. As shown in FIGURES 2 and 3, the subbase 66 is fashioned with an angularly arranged pad portion 280 upon which is mounted a support 282 having a flange portion 284 electrically insulated from the subbase 66 by an insulating member 285 and secured on the pad portion 280 by screws 286 which extend through insulating bushings (not shown).

The support member 282 is fashioned with a cylindrically-shaped tubular portion 288 providing a cylindrically-shaped hollow interior. Disposed interiorly of the cylindrical portion 288 is a cylindrically-shaped member 290 which is snugly yet slidably fitted into the member 288.

The wall portion 288 is fashioned with an opening 292 and the adjacent region of the member 290 provided with a series of rack teeth 294. Member 282 supports a shaft 296 on which is mounted a sleeve 297 equipped with a spur gear 298, the teeth of which are in mesh with the rack teeth 294.

The cylindrically-shaped member 290 is fashioned with a lengthwise recess or keyway 300 and a wall region of the portion 288 fashioned with an opening accommodating a key or element 302 which extends into the keyway 300. Through this arrangement the rack teeth 294 are maintained in proper enmeshment with the teeth of the spur gear 298 during lengthwise movement of the member 290. The member 290 supports means for directly mounting the negative electrode 304 and provided with channel means for continuously delivering an inert gas along the negative electrode to establish an inert atmosphere at the region of the arc between the positive and negative electrodes.

Figure 7:
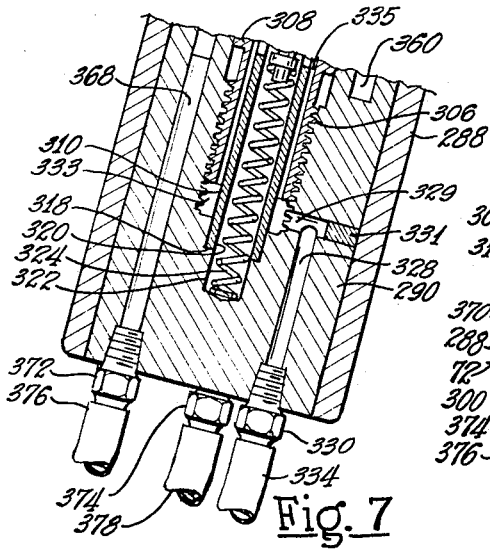
FIGURE 7 is a sectional view taken substantially on the line 7—7 of FIGURE 8.
Figure 6:
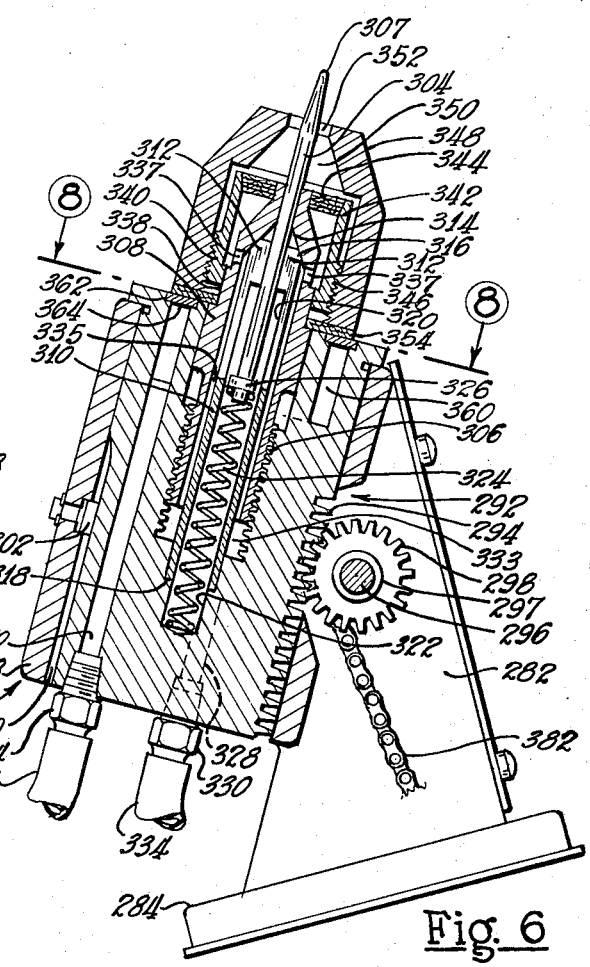
FIGURE 6 is a longitudinal sectional view through the mounting means for the negative electrode, the view being taken substantially on the line 6—6 of FIGURE 8.

As shown in FIGURES 6 and 7, the member 290 is provided with an interior bore threaded to receive the threaded portion 306 of a member 308. The member 308 has a central bore in which is disposed a tubular member 310 which provides a chuck or retaining means for the negative electrode 304. The upper region of the member 310 is provided with two diametrical slots at right angles to form four chuck jaws 312, two of the chuck jaws being shown in FIGURE 6. The member 308 is fashioned with an interior frusto-conical shape 314 and the upper end regions of the chuck jaws are chamfered as at 316.

The member 310 is engaged with a circular ledge 318 to position the member 310 with respect to the member 290. In assembly, with the electrode 304 telescoped into the hollow interior of the member 310, the member 308 is threaded into the threaded bore in member 290 and the frusto-conical shape 314 engages the chamfered regions 316 of the chuck jaws 312 to draw the jaws into intimate gripping engagement with the negative electrode 304 to secure the electrode in fixed position with respect to its mounting means, the member 310 having an interior bore 320 to accommodate the electrode 304.

The interior bore in member 310 is in alignment with a bore 322 in the member 290, the bores accommodate an expansive coil spring 324. Disposed between the lower end of the negative electrode 304 and the coil spring 324 is a member 326 having a flange portion engaged by the spring whereby the spring 324 biases the negative electrode upwardly when the chuck jaws 312 are released. Through this arrangement, the position of the negative electrode may be adjusted against the pressure of the spring 324 and the electrode manually held in adjusted position while the member 308 is drawn up to bring the chuck jaws 312 into retaining engagement with the negative electrode.

Provision is made for directing an inert gas, such as argon gas, along the negative electrode to the region of the arc to establish an inert or nonoxidizing atmosphere for the arc, the inert gas providing a low resistance path for the arc current.

As shown in FIGURES 7 and 8, a channel 328 is drilled in the body 290 at one side of the longitudinal axis of the body. The lower end of the channel 328 is in communication with a tubular fitting 330 threaded into a threaded bore in the member 290. A transversely drilled passage 329 is provided in the body 290 connecting the channel 328 with the space 333 beneath the member 308, the end of passage 329 being closed by a plug 331.

The exterior diameter of the chuck member 310 is less than the central bore in the member 308 providing an elongated annular clearance space 335. The fitting 330 is connected with a flexible tube 334 which conveys an inert gas, such as argon gas, from a tank or other supply (not shown) under pressure through the channel 328, transverse passage 329, space 333, along the chuck member 310 through the clearance space 335 thence through openings 337 in the upper region of the member 308 for delivery along the negative electrode into the arc as hereinafter described.

A manually operable control valve (not shown) of conventional construction is provided for the gas conveying tube 334 for regulating the flow of argon gas delivered to the region of the arc. The member 308 is provided with a cylindrical surface 338 and press fitted onto the surface is a cylindrically shaped member 340.

The member 340 is formed with a sleeve portion 342 and mounted interiorly at the upper end of the sleeve portion 342 is a plurality of comparatively fine mesh screens 344. The screens are of about 100 mesh and three screens have been found satisfactory for distributing the inert gas circumferentially around the negative electrode 304.

The member 340 has an exterior threaded region 346 and threaded thereon is a nose cone 348 fashioned interiorly with a frusto-conically shaped space or chamber 350 and a circular opening 352 through which projects the negative electrode 304, the opening 352 being of larger diameter than the electrode 304 to accommodate gas flow through the opening. A gasket 354 is disposed between the nose cone 348 and the member 290 to form a fluid tight seal.

Provision is made for cooling the member 290 and associated components. As shown in FIGURES 6 and 8, the upper region of member 290 is fashioned with a circular, C-shaped recess 360 and the upper surface region of member 290 is fashioned with a second C-shaped recess 362 concentric with the recess 360. A C-shaped cover member 364 is fitted into the C-shaped recess 362 and brazed or welded providing a closed chamber of the recess 360. Drilled lengthwise of the member 290 are two bores 368 and 370 which are in communication respectively with the end regions of the C-shaped recess 360.

The ends of the bores 368 and 370 are in communication with fittings 372 and 374 threaded into bores in the lower end of the member 290. Flexible tubes 376 and 378 connect the fittings with a supply of cooling fluid such as water which is circulated under comparatively low pressure through the chamber 360 of member 290 to maintain the member 290 and associated components at a safe operating temperature.

Water or other heat-absorbing fluid flows through the inlet tube 376, fitting 372, bore 368, through the C-shaped recess or chamber 360, through the outlet bore 370, fitting 374 and tube 378 to convey heat away from the member 290.

The mounting means 290 for the negative electrode is movable toward and away from the positive electrode to strike the arc. Mounted on the sleeve 297 carrying the spur gear 298 is a sprocket 380 driven by a chain 382 which engages with a driving sprocket 384 mounted on a shaft 386 journaled in the subbase 66 and driven by the motor 46, shown in FIGURE 1, controlled so as to be energized when it is desired to strike the arc and its direction reversed to retract or withdraw the negative electrode to a proper position to provide the correct arc gap. Current is conveyed to the negative electrode through a flexible connector or strip 391, shown in FIGURE 3.

Figure 5:
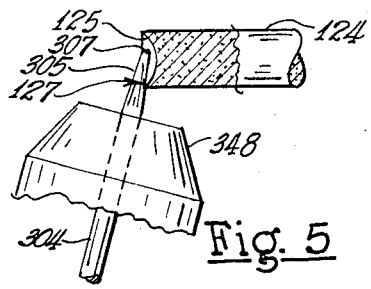
FIGURE 5 is a detail view illustrating the relative positions of the electrodes in striking the arc.

The negative electrode is of thoriated tungsten, preferably tungsten impregnated with about 2% thorium. It will be noted from FIGURES 3, 4 and 5 that the portion 305 of the negative electrode 304 is of slight taper terminating in a rounded tip 307. The longitudinal center line of the negative electrode is forwardly of the crater 125 formed by the arc in the terminal region of the positive electrode 124. The tapered portion 305 of the negative electrode enables the striking of the arc wherein a lower forward edge 127 of the positive electrode engages the negative electrode 304 at a region spaced from the tip 307, as shown in FIGURE 5.

It is desirable that the arc be struck by engagement of the negative electrode with the positive carbon at a region spaced from the tip 307 of the negative electrode so that the tip of the negative electrode does not become contaminated with tungsten carbide. In striking the arc, the motor 46 is rotated to move the member 290 and its components including the negative electrode upwardly to the position indicated in FIGURE 5 in which position, the positive electrode is advanced automatically until the edge region 127 of the positive electrode engages the negative electrode to form the arc.

Upon formation of the arc, the motor 46 is automatically reversed and the negative electrode withdrawn or retracted a short distance to a position providing the most efficient arc for energy radiation and thereafter the negative electrode is maintained in a fixed position throughout arc operation. Through this arrangement, operating mechanism including feed rollers and feeding devices for the negative electrode are eliminated because the negative electrode provides an arc of continuous operation without appreciable consumption of the negative electrode and does not require adjustment during operation.

It is found that most efficient operation of the arc is obtained in an inert atmosphere such as an atmosphere of argon gas. The inert atmosphere serves two functions, viz. it retards oxidation and contamination of the negative electrode, and provides a low resistance ionized gas path for the current at the arc.

It has been found that by changing the flow rate of gas delivered along the negative electrode to the arc, the radiation output intensity of the arc may be varied. By increasing the gas flow rate, the radiation intensity output from the arc is increased. As an example, by increasing the gas flow rate from ten cubic feet per hour to fifteen cubic feet per hour, the radiation intensity increased from 1400 to 1580 watts per square meter. While argon is preferred as an inert gas, it is to be understood that other inert gases may be used for the purpose if desired.

The lamp construction preferably embodies a lenticular lens system for concentrating and controlling the radiant energy from the arc. With particular reference to FIGURE 2, there is disposed adjacent the forward end of the lamp housing a lenticular lens 400. The lenticular lens 400 has its central axis preferably aligned with the axis of the positive electrode. A second lenticular lens 402, shown in FIGURES 2 and 10, of larger diameter is disposed within the lamp housing and spaced from the lens 400. The central axis of the lenticular lens 402 is coincident with the axis of the lens 400.

As shown in FIGURE 10, the lens 402 is fashioned with an arcuate slot 404, the arcuate edges defining the slot being generated about the axis of the shaft 176 which supports the positive electrode transfer frame or arm 186. The purpose of the slot 404 is to accommodate the transfer of positive electrode sections into aligned relation with the positive electrode being fed to the arc.

The lenticular lens 402 is made up of a large number of small lenses 408, and the lens 400 is made up of an equal number of small lenses of proportionately smaller size, the lens arrangement being of the character disclosed in U.S. patent to Schering and Merz, 2,183,249. Through the use of this lens system, an increased amount of radiant energy can be projected to the work area, this lens system enabling the intensity of the radiant energy to be varied without varying the uniformity of energy distribution.

An image screen 412, shown in FIGURE 1, is mounted on the cover 14 of the lamp housing. The screen 412 receives an image from an angularly positioned mirror 414 supported by a bracket 416 mounted on the cover 14. An opening in the cover beneath the mirror 414 admits the image of the arc for reflection by the mirror 414 onto the screen 412. The arc circuit and the control circuit for the feed motor 44 for the positive electrode feed mechanism have not been shown herein but are of the character disclosed in U.S. Patent 3,104,066. A crank member (not shown) may be mounted upon the drive shaft 108 for the positive electrode feed mechanism for manually adjusting the position of the positive electrode section, if desired.

The control circuits for the automatic arc striking mechanism, actuation of the electrode transfer mechanism and energization of the heating unit for the positive electrode section joining means are illustrated in FIGURE 13.

The operation of the various components, the switch mechanisms and relays will be described in connection with the explanation of the control circuits shown schematically in FIGURE 13. The magazine 36 is first filled with a supply of positive electrode sections or carbons 124', the recess in an end of each section having a small quantity or pellet of heat-softenable bonding resin therein.

If the lamp has not been previously used, a positive electrode section is manually inserted in the positive electrode feed head 70 by swinging the bracket 110 to a position to admit the electrode section in an operative arc forming position. The arc forming end of the first electrode section is preformed with a concave recess or crater indicated at 125 in FIGURE 5. The positive electrode may be adjusted lengthwise by manually rotating the feed drive shaft 108.

The thoriated tungsten electrode 304 is inserted in its mounting shown in FIGURE 6. The cap 348 is removed from the member 342. The member 308 being in an upper position with the cone-shaped portion 314 out of engagement with the chamfered portions 316 of the chuck 312, the negative electrode is inserted into the interior bore in the chuck 312 and the electrode manually adjusted to the proper position, which movement compresses the spring 324 as an assist in positioning the electrode.

When the electrode has been thus positioned with the proper amount of the electrode extending from the mounting, the member 308 is threaded into the threaded bore in the body 290 until the chuck jaws 312 are drawn into engagement with the electrode 304 by the frustoconical shape 314. The cap 348 is then threaded onto the member 342 into engagement with the gasket 354. The negative electrode is adjusted so that the arc forming portion of the electrode 304 will be positioned with the tip 307 in the position illustrated in FIGURE 5, the tip 307 being above the center line of the positive electrode 124 a distance of about one-quarter of the diameter of the positive electrode.

It should be noted from FIGURE 5 that in striking the arc, contact of the negative electrode 304 is made with the positive electrode 124 at the lower edge 127 of the crater 125 so that there is no contamination of the tip 307 of the negative electrode. With reference to the circuit diagram, FIGURE 13, a master switch (not shown) connected with the current supply lines L1 and L2, which is a single phase alternating current supply, is closed.

The closing of the master switch energizes the motor M3 which operates a water pump (not shown) for circulating cooling water through the coils or loops of tubing 132 shown in FIGURE 9 for cooling the region of the positive electrode adjacent the arc and circulating cooling water through the C-shaped channel 360 in the member or body 290 which supports the negative electrode 304.

The current for producing the arc is direct current. In order to secure direct current, three phase alternating current is connected with the rectifier 420, shown schematically in FIGURE 13, by current supply leads L3, L4 and L5, the current being rectified and conveyed to the arc circuit through leads 422 and 424.

The switch SW-1, shown in FIGURE 13, is manually closed to energize the control circuit, this action energizing a fan motor 428 for cooling the rectifier 420. The arc "power on" switch 430 is then manually closed energizing the arc power contactor 432 through a pressure interlock switch 431, this action closing contacts C1, C2 and C3 supplying the three phase current to the rectifier 420. This action also closes contact 434 sealing in the contactor coil of contactor 432. The "arc power on" light LT-6 is on. Relay coil R3 is energized through contact R4-2, limit switch LS-7 and contact 434. Contacts R3-1 and R3-2 close, energizing the arc strike motor 46, shown in FIGURE 1 and in the circuit diagram, FIGURE 13.

The motor 46 moves the negative electrode 304 from its retracted position shown in FIGURE 3 to the position shown in FIGURE 5, viz. arc striking position. The energization of the arc strike motor 46 rotates shaft 386, shown in FIGURE 3, sprocket 384, driving chain 382, sprocket 380, rotating the shaft 296 to rotate the pinion or spur gear 298. The gear 298 is in mesh with the toothed rack 294 of the body member 290 and rotation of the gear 298 moves the body 290 upwardly as viewed in FIGURES 3, 4 and 5 to bring the electrode 304 to arc-forming position shown in FIGURE 5.

The positive electrode 124 is advanced by the motor 44, the control circuit therefore not being shown herein but is of the character disclosed in U.S. Patent 3,104,066. As the negative electrode 304 moves upwardly it is engaged with the positive electrode 124 in the manner shown in FIGURE 5 wherein the lower edge 127 of the crater 125 of the positive electrode engages the tapered portion 305 of the negative electrode at a region spaced from the tip 307 thereof. Thus the arc is established initially at a region spaced from the tip of the negative electrode so that there is no initial arcing occurring at the tip.

Current relay "CR" contact closes which energizes timer T2 which initiates timing. The relay R4 is energized opening contacts R4–2 and closing contact R4–3. The relay R3 is deenergized opening contacts R3–1 and R3–2. Also, relay coil R5 is energized through a rear limit switch LS–8, contacts R5, R5–1 closes, this action reversing the direction of the arc strike motor 46 to initiate retraction of the negative electrode 304.

The timer contact T2 closes energizing a contactor coil causing contacts R6 to close which shorts three reactors (not shown) in the three-phase line placing full voltage on the arc. The negative strike motor 46 reaches its rear position which engages and opens rear limit switch LS–8 and this action deenergizes relay R5. R5–1 and R5 open, de-energizing the arc strike motor 46.

When a positive electrode section or carbon is consumed to the extent that it moves away from engagement with the arm 238 of limit switch LS–1, the operations in transferring a positive electrode section 124′ from the magazine 36 to a position in alignment with the preceding electrode section are initiated. Limit switch LS–1 is closed with the switch at position "a" and opens at "b." Motor 158 is energized through limit switch LS–1 "a" and through limit switch LS–3 "a."

The magazine motor 158 rotates the drum or electrode section selector 156. An electrode section 124′ from the first row of electrode sections in the magazine which registers with the U-shaped recess 164, shown in FIGURE 12, receives a section 124′ and conveys it to the transfer arm or frame means 186 shown in FIGURE 10. During rotation of the electrode conveying drum 156, limit switch DR–1 closes. Limit switch DR–2 closes momentarily energizing relay coil R2. The relay R2 seals in through interlock contact R2–1 and the forward limit switch LS–4 "a." Contact R2–2 is closed to provide power for the clutch control mechanism.

Contacts R2–3 and R2–4 are closed, supplying current to motor 180 to actuate the electrode section transfer arm 186, shown in FIGURE 10, to transfer a selected electrode to an operative position in alignment with the previously transferred electrode section.

Contact R2–5 is open. The limit switch LS–5 opens and this condition de-energizes the magnetic clutch 206. The limit switch LS–3 is opened from contact "a" and closed to contact "b." The electric heating coil 250 of the oven 248 is energized through the transformer TRS–1 which softens and fuses the resin pellet 244 to bond the telescoped portions of the aligned positive electrode sections together.

The selector drum 156 continues to rotate through the limit switch DR–1. At the end of a complete rotation of the electrode selector drum 156, limit switch DR–1 opens, stopping rotation of the drum actuating motor 158 at its initial start position. Shaft 176 is rotated by the motor 180, and through the medium of the threaded connection between the bushing 192 and the threaded portion 194 of the shaft, and the transfer arm 186 travels forwardly, in a right-hand direction as viewed in FIGURE 9. This forward movement of the transfer arm 186 compresses the coil spring 242 to continue the lengthwise pressure on the transferred electrode section 124′.

When the transfer arm 186 reaches the limit of its forward movement, it operates limit switch LS–4 opening contact LS–4 "a" and closing contact LS–4 "b." Relay R2 is de-energized, which action opens contacts R2–1, R2–3, R2–4 and R2–2. Contact R2–5 closes. The thermal timer T1 is energized and starts to time the duration of current flow through the oven heater 250. When the timer T1 times out, in approximately one minute or less, contact T1–1 closes. Relay R1–1 is energized through limit switch LS–3 "b," timer contact T1–1 and contact R2–5. Contact R1–2 seals in relay R1–1.

Contacts R1–3, R1–4 and R1–5 are closed. This action reverses the motor 180 (M2) which moves the transfer arm 186 to its initial position shown in full lines in FIGURE 10 in position to receive an electrode from the selector drum 156. The forward limit switch LS–4 resets to its original position, closing contact "a." Limit switch LS–5 closes to complete a circuit energizing the clutch 204 through contact R1–5. The return movement of the transfer arm 186 operates limit switch LS–3 closing contact "a" and opening contact "b."

Relay R1–1 drops out, opening contacts R1–2, R1–3, R1–5 and R1–4. This action interrupts the circuit to motor 180 (M2) and the transfer arm 186 stops in its initial position. The limit switch LS–6 is actuated to closed position by means (not shown) associated with the magazine 36, which switch is actuated when the carbon supply of two hours remains in the magazine. When the limit switch LS–6 is closed, a signal light 438 is energized to alert the operator to replenish the supply of positive electrode sections in the magazine 36.

The foregoing described construction provides a lamp embodying a nonconsumable negative electrode and a continuing supply of positive electrode sections whereby arc operation is continuous upon timely replenishment of the supply of positive electrodes in the magazine 36. The lenticular lens system comprising lenses 400 and 402, shown in FIGURE 2, redirects radiant energy from the arc to obtain the most efficient distribution and use of the available energy.

If desired, an air stream may be provided adjacent the flame of the arc to position the flame so as to reduce to a minimum the tendency for combustion residue to collect on the reflector 62. The thoriated tungsten electrode 304 functioning in an inert atmosphere provided by the argon gas, provides a highly efficient arc without appreciable oxidation of the negative electrode to attain arc operation substantially indefinitely. By regulating the flow rate of the argon gas or other inert gas supplied to the arc, the intensity output of radiant energy may be varied within limits providing an additional control for the energy output.

It is apparent that, within the scope of the invention, modifications and different arrangements may be made other than as herein disclosed, and the present disclosure is illustrative merely, the invention comprehending all variations thereof.

I claim:

1. The method of operating an arc lamp including disposing a positive carbon electrode and a negative metal electrode on converging axes, effecting relative movement between the electrodes to contact a region of the negative electrode spaced from the tip thereof with an edge of the positive carbon electrode to establish an arc, and thereafter moving the positive electrode at a rate to maintain substantially constant the arc between the electrodes.

2. The method of operating an arc lamp including disposing a positive carbon electrode and a negative metal electrode on converging axes, moving the negative electrode toward an end of the positive electrode to engage a region of the negative electrode spaced from the tip thereof with an edge of the positive electrode to establish an arc, retracting the negative electrode out of contact with the positive electrode upon establishment of the arc, and moving the positive electrode to maintain substantially constant the arc between the electrodes.

3. The method of operating an arc lamp including disposing a carbon positive electrode and a tungsten negative electrode on converging axes, moving the negative electrode toward an end of the positive electrode to engage a region of the negative electrode spaced from the tip thereof with a forward edge of the positive electrode to strike the arc, retracting the negative electrode out of contact with the positive electrode, feeding the positive electrode toward the negative electrode at a rate to maintain substantially constant the arc between the electrodes, and delivering inert gas to the region of the arc to maintain a low resistance path for the current at the arc.

4. The method of maintaining continuous operation of an arc lamp including establishing a substantially non-consumable negative metal electrode in a relatively fixed position, initially moving the negative electrode toward an end of a positive carbon electrode section to engage a region of the negative electrode spaced from the tip thereof with an edge of the positive electrode section to establish the arc, advancing the positive electrode section at a rate to maintain substantially constant an arc between the electrodes, establishing a supply of positive electrode sections, successively transferring individual positive electrode sections into aligned relation with a positive electrode section forming the arc, joining the aligned positive electrode sections to provide a continuous positive electrode, and delivering an inert gas to the region of the arc to maintain a low resistance path for the current at the arc.

5. The method of maintaining continuous operation of an arc lamp including establishing a negative tungsten electrode in a relatively fixed position, initially moving the negative electrode toward an end of the positive electrode to engage a region of the negative electrode spaced from the tip thereof with an edge of a positive carbon electrode section to establish the arc, advancing the positive electrode section at a rate to maintain substantially constant an arc between the electrodes, establishing a supply of positive electrode sections, successively transferring individual positive electrode sections into aligned relation with an electrode section forming the arc, joining the aligned positive electrode sections to provide a continuous positive electrode, and delivering argon gas along the negative electrode toward the arc to maintain a low resistance path for the current at the arc.

6. In combination, a housing, positive and negative electrodes, means in said housing supporting and advancing the positive electrode toward arc forming position, mounting means in said housing for the negative electrode, said negative electrode being of substantially non-consumable metallic material, the positive electrode being of carbon, and means for effecting relative movement between the electrodes to establish contact of a region of the negative electrode spaced from the tip thereof with an edge of the positive electrode to establish an arc.

7. In combination, a housing, positive and negative electrodes, means in said housing supporting and advancing the positive electrode toward arc forming position, mounting means in said housing for the negative electrode, said negative electrode being of tungsten, means for effecting relative movement between the electrodes to establish contact of a region of the negative electrode spaced from the tip thereof with an edge at the end of the positive electrode to establish an arc, reflector means in said housing for collecting and reflecting radiant energy from the arc, and means for delivering an inert gas to the environment of the arc to provide a low resistance path for the current at the arc.

8. In combination, a housing, positive and negative electrodes, said positive electrode being of carbon means in said housing supporting and advancing the positive electrode toward arc forming position, mounting means in said housing for the negative electrode, said negative electrode being of tungsten, means for initially advancing the negative electrode to a position to establish contact of a region thereof spaced from the tip with an edge of the positive electrode to strike the arc, reflector means in said housing for collecting and reflecting radiant energy from the arc, and means for delivering argon gas to the environment of the arc to provide a low resistance path for the current at the arc.

9. In combination, a housing, positive and negative electrodes, means in said housing supporting and advancing the positive electrode toward arc forming position, mounting means in said housing for the negative electrode, said negative electrode being of substantially non-consumable metal, said mounting means for the negative electrode including a relatively stationary member, a body carried by said member and movable relative to said member, chuck means mounted on the body supporting the negative electrode, a chamber in said body, inlet and outlet passages in said body arranged to convey cooling fluid through said chamber, a cap on said body having an opening accommodating the negative electrode, a gas passage in said body arranged to be connected with a supply of inert gas whereby the gas is delivered along the negative electrode to the region of the arc, and means for effecting movement of said body to engage a region of the negative electrode spaced from the tip thereof with an end of the positive electrode to establish an arc.

10. In combination, a housing, positive and negative electrodes, means in said housing supporting and advancing the positive electrode toward arc forming position, mounting means in said housing for the negative electrode, said negative electrode being of tungsten, said mounting means for the negative electrode including a relatively stationary member, a body carried by said member and movable relative to said member, chuck means mounted on the body supporting the negative electrode, a chamber in said body, inlet and outlet passages in said body arranged to convey cooling fluid through said chamber, a cap on said body having an opening accommodating the negative electrode, a gas passage in said body arranged to be connected with a supply of argon gas whereby the gas is delivered along the negative electrode to the region of the arc, means for initially moving the negative electrode to strike the arc, said negative electrode moving means being arranged to retract the negative electrode to a predetermined fixed position, and reflector means in said housing for collecting and reflecting radiant energy from the arc.

References Cited

UNITED STATES PATENTS

| 1,948,669 | 2/1934 | Lightner | 240—41 |
| 2,779,890 | 1/1957 | Frenkel | 313—231 |
| 3,304,460 | 2/1967 | Cargill et al. | 219—121 |

NORTON ANSHER, *Primary Examiner.*

WINDHAM M. FRYE, RICHARD M. SHEER,
*Assistant Examiners.*